United States Patent
Melen

(10) Patent No.: US 12,483,872 B2
(45) Date of Patent: Nov. 25, 2025

(54) AUTOMATIC EMERGENCY CALL WITHOUT TIME DELAY

(71) Applicant: AUDI AG, Ingolstadt (DE)

(72) Inventor: Okan Melen, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 356 days.

(21) Appl. No.: 18/219,273

(22) Filed: Jul. 7, 2023

(65) Prior Publication Data

US 2024/0015494 A1    Jan. 11, 2024

(30) Foreign Application Priority Data

Jul. 7, 2022    (DE) ..................... 10 2022 116 940.5

(51) Int. Cl.
*H04W 4/90*    (2018.01)
*G07C 5/00*    (2006.01)
*H04W 4/40*    (2018.01)

(52) U.S. Cl.
CPC ............. *H04W 4/90* (2018.02); *G07C 5/008* (2013.01); *H04W 4/40* (2018.02)

(58) Field of Classification Search
CPC ........... H04W 4/90; H04W 4/40; G07C 5/008
USPC ..................................................... 455/404.1
See application file for complete search history.

(56) References Cited

U.S. PATENT DOCUMENTS

| | | |
|---|---|---|
| 7,181,192 B2 | 2/2007 | Panasik et al. |
| 9,020,690 B2 * | 4/2015 | Mckown .............. G08B 25/001 701/33.7 |
| 9,949,104 B1 * | 4/2018 | Call ........................ G07C 5/008 |
| 2011/0096912 A1 * | 4/2011 | Stahlin ................. G08B 25/001 379/39 |
| 2012/0146766 A1 * | 6/2012 | Geisler .................. G07C 5/085 340/8.1 |
| 2013/0040599 A1 | 2/2013 | Berg et al. |
| 2021/0409916 A1 * | 12/2021 | Briemle ............... G08B 25/016 |
| 2022/0030408 A1 * | 1/2022 | Zhang ..................... H04W 4/90 |

FOREIGN PATENT DOCUMENTS

| | | |
|---|---|---|
| DE | 10 2010 053 606 A1 | 6/2012 |
| DE | 10 2015 215 294 A1 | 2/2017 |
| DE | 10 2018 200 570 A1 | 7/2019 |
| DE | 10 2022 116 940.5 | 7/2022 |
| EP | 3 478 548 B1 | 4/2020 |
| EP | 3 979 222 A1 | 4/2022 |

* cited by examiner

*Primary Examiner* — Hirdepal Singh

(74) *Attorney, Agent, or Firm* — STAAS & HALSEY LLP

(57) ABSTRACT

A method for sending an emergency call in which a control device of a vehicle automatically sends an emergency call, comprising a data packet, to a backend server of a control center and the server receives the emergency call that is sent, a data structure for an emergency call, a control device for a vehicle, and a backend server for a control center.

16 Claims, 1 Drawing Sheet

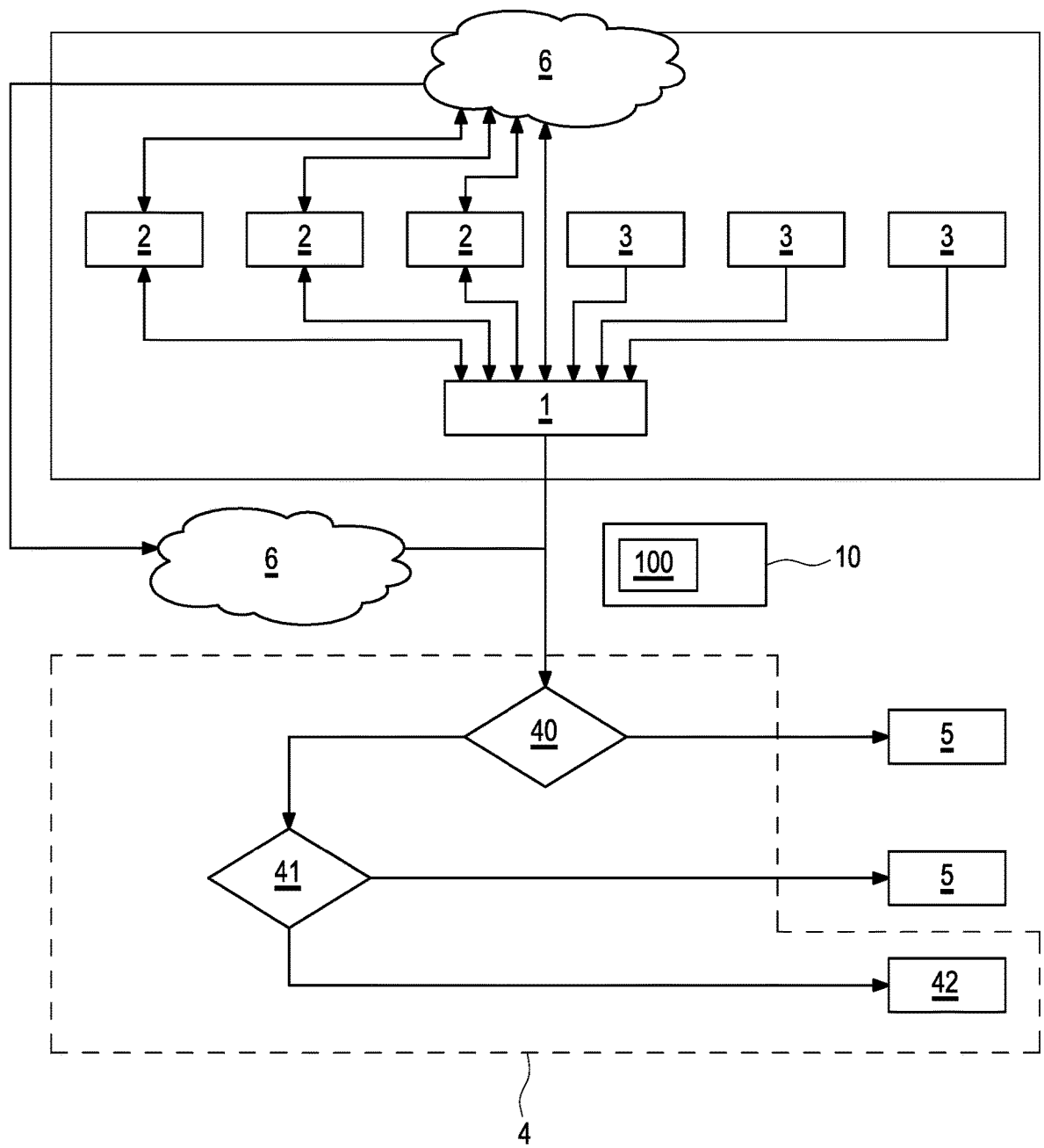

AUTOMATIC EMERGENCY CALL WITHOUT TIME DELAY

CROSS REFERENCE TO RELATED APPLICATION

This application claims benefit of priority under 35 USC 119 based on German Patent Application No. 10 2022 116 940.5 filed on Jul. 7, 2022, the entire contents of which are incorporated by reference herein.

BACKGROUND

Described herein is a method for sending an emergency call in which a control device of a vehicle automatically sends an emergency call, comprising a data packet, to a backend server (backend) of a control center and the backend server receives the emergency call that is sent. Also described herein is a data structure for an emergency call, to a control device for a vehicle and to a backend server for a control center.

Methods of the type stated at the beginning of various forms are included in the prior art and serve the purpose of increasing safety of a vehicle, in particular a passenger car. For sending an emergency call, the vehicle automatically sets up a connection to a control center and enables an occupant of the vehicle to request assistance from the control center by telephone. The connection is referred to as an eCall (emergency call) and increases safety of the vehicle.

Additional data can be transmitted via the voice connection, in particular inaudibly, data concerning an accident of the vehicle that can scarcely be ascertained by an occupant of the vehicle and makes it considerably easier for the control center to ascertain adequate assistance.

Such a method for sending an emergency call is disclosed by DE 10 2018 200 570 A1. In the method, a control device of a vehicle sends an emergency voice call to a backend of a control center. An audio signal of the emergency voice call comprises at least one signal pattern, which is detected by the backend. Dependent on each detected signal pattern, the backend ascertains an emergency category and initiates a measure corresponding to the emergency category ascertained.

Not only in the case of an emergency but also during normal operation of the vehicle, driving safety of the vehicle is of great interest. For example, the vehicle can actively counteract involvement of the vehicle in an accident where the likely cause is a driver of the vehicle happening to become incapable of driving while at the wheel.

EP 3 478 548 B1 discloses such an operating method for a vehicle. During normal operation of the vehicle, a sensor of the vehicle senses vital parameters of a driver of the vehicle. The vehicle automatically changes to a fully autonomous operating mode and takes itself to a predetermined destination, for example a hospital, if a value of a sensed vital parameter satisfies a predetermined condition.

In the event of an accident of the vehicle, sensors of the vehicle can sense typical accelerations of the vehicle and provide corresponding acceleration signals. On the basis of the acceleration signals provided, the control device can detect that the vehicle has been involved in an accident and automatically send the emergency call directly after it is detected that the vehicle has been involved in an accident. However, older vehicles in particular do not comprise a control device for sending an emergency call.

To compensate for this disadvantage, U.S. Pat. No. 7,181,192 B2 discloses a method in which a sensor of a mobile terminal arranged in a vehicle senses an acceleration and provides an acceleration signal corresponding to the acceleration sensed. The mobile terminal automatically sends an emergency call to a control center if the acceleration signal provided substantially matches an acceleration profile stored in the mobile terminal.

The emergency call must be sent to a prescribed control center. The prescribed control centers include on the one hand public control centers (Public Safety Answering Points, PSAPs), known as emergency call centers, and on the other hand private control centers (Third Party Service Providers, TPSPs), known as call centers, which are provided by vehicle manufacturers. In many cases, the control device is designed to send the emergency call to a private control center.

If the private control center cannot provide adequate assistance, the private control center forwards the emergency call to a public control center. Checking the emergency call and deciding on whether to forward the emergency call result in a time delay if the emergency call ultimately has to be forwarded to the public control center. The time delay may however reduce the effectiveness of the assistance, which in itself is adequate, provided by the public control center, which adversely affects the safety of the vehicle.

SUMMARY

An aspect of the disclosure is a method for sending an emergency call in which an emergency call that is sent is forwarded to a public control center as far as possible without a time delay.

Another aspect of the disclosure is a method for sending an emergency call in which a control device of a vehicle automatically sends an emergency call, comprising a data packet, to a backend server (backend) of a first control center and the backend server receives the emergency call that is sent. By the emergency call that is sent, adequate assistance is requested from the first control center. The control device may cause a communication unit of the vehicle to provide a connection to the backend server, and send the emergency call via the connection provided. The emergency call may be sent automatically as a consequence of an accident event sensed by sensors of the vehicle or be sent manually by an actuating event performed by an occupant of the vehicle, for example pressing an emergency button.

The emergency call that is sent includes a data packet, which is transmitted via the connection provided to the backend server and comprises digitally processable data concerning the vehicle. The backend server may be provided as an application, which is in particular implemented by software and is executed by a server, i.e. a powerful computing device, of the first control center. The first control center may be a private control center.

According to an aspect of the disclosure, the backend server forwards the received emergency call directly and automatically to a second control center when a value of a parameter contained in the received data packet satisfies a predetermined condition. The second control center may be a public control center and may include a server. The value of the parameter makes it possible to decide automatically and immediately that the first control center does not provide the adequate assistance requested, and the emergency call must be forwarded to the second control center. In this way, a time delay when forwarding the emergency call to the second control center is eliminated.

Moreover, the backend server assigns the received emergency call to the first control center when the value of the parameter contained in the received data packet does not satisfy the predetermined condition. Similarly, the value of the parameter makes it possible to decide automatically and immediately that the first control center provides the adequate assistance requested, and the emergency call does not need to be forwarded to the second control center. In this way, the adequate assistance requested can in any case be provided as quickly as possible.

Also according to an aspect of the disclosure, the control device ascertains a confidence value of the parameter, the control device transmits the ascertained confidence value to a cloud server and the cloud server stores the transmitted confidence value. The value of the parameter may be incorrect because of a malfunction of the vehicle, to be more precise a control device or a sensor of the vehicle. Each incorrect value of the parameter adversely affects the decision as to whether the first control center or the second control center provides the adequate assistance requested. The confidence value indicates a probability of the value of the parameter being correct, and makes it possible for the value to be assessed for its reliability. Thanks to the storing of the confidence value in the cloud server, the confidence value is protected from a malfunction of the vehicle.

According to an aspect of the disclosure, the cloud server transmits the stored confidence value to the backend server of the first control center. The stored confidence value is transmitted via a connection of the backend server to the cloud server. The connection may be passed on by a further cloud server.

According to an aspect of the disclosure, the backend server forwards the received emergency call immediately and automatically to the second control center when the transmitted confidence value is greater than a predetermined minimum confidence value. This eliminates the possibility of an incorrect value of the parameter leading to a wrong decision of whether the first control center or the second control center provides the adequate assistance requested.

The confidence value is ascertained and transmitted to the cloud server at regular time intervals and/or on an event-controlled basis. It is in this way ensured that the stored confidence value is up-to-date.

Another aspect of the disclosure is a data structure for a data packet of an automatic emergency call which defines a minimum amount of data for the emergency call and defines at least one parameter for a method according to one example of the invention. The minimum amount of data (Minimal Set of Data, MSD) is standardized by EN 15722: 2020. The at least one parameter may belong to the standard EN 15722:2020 or add to the standard EN 15722:2020.

The at least one parameter comprises a collision speed, a collision angle, a collision point and/or an activation behavior of a restraint system of a vehicle as the at least one parameter. The stated parameters are only given by way of example and are not exhaustive. Each parameter that allows the seriousness of an accident to be deduced comes into consideration for use in the method according to an aspect of the invention. It goes without saying that the method according to an aspect of the invention may be based on a plurality of parameters, which is accompanied by greater precision of the method. The corresponding conditions may include in each case ranges of collision speeds, collision angles, collision points and/or activation of the restraint system.

Another aspect of the disclosure is a control device for a vehicle which is designed for sending an emergency call. Such control devices are fitted in numerous vehicles. There are correspondingly a wide variety of applications for the invention.

According to examples of the invention, the control device is designed to be involved in a method according to one example of the invention for sending the emergency call. The control device increases the safety of the vehicle.

Another aspect of the disclosure is a backend server for a control center which is designed for receiving an emergency call that has been sent. The control center is, for example, a private control center provided by a manufacturer of a vehicle.

According to an aspect of the disclosure, the backend server is designed to be involved in a method according to one example of the invention for receiving the emergency call. Dependent on the emergency call that is received, the backend server automatically ensures immediate forwarding of the emergency call to a second control center, which is designed as a public control center. In this way, safety of the vehicle is increased.

An essential advantage of the method according to an aspect of the invention is that it increases safety of a vehicle. A gain in safety results from avoiding a time delay when it is required for an emergency call sent by the vehicle to be forwarded to a competent control center, which is accompanied by high efficiency of adequate assistance provided by the competent control center.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 1 shows in a flow diagram a method according to one example of the invention for sending an emergency call.

DETAILED DESCRIPTION

Reference will now be made in detail to the preferred embodiments, examples of which are illustrated in the accompanying drawings, wherein like reference numerals refer to like elements throughout.

FIG. 1 shows in a flow diagram a method according to one example of the invention for sending an emergency call 10.

A control device 1 according to one example of the invention is suitable for a vehicle and designed to be involved in the method according to an example of the invention for sending the emergency call 10. The emergency call 10 may comprise a data packet 100.

A data structure according to one example of the invention defines a minimum amount of data (Minimal Set of Data, MSD) and at least one parameter for the data packet 100 and is suitable for the method according to an example of the invention. The data structure may comprise a collision speed, a collision angle, a collision point and/or an activation behavior of a restraint system of the vehicle as the at least one parameter.

The control device 1 may be functionally connected to further control devices 2 of the vehicle and sensors 3 of the vehicle and be designed to receive data or signals from the further control devices 2 and sensors 3. Shown here for example are three further control devices 2 and three sensors 3, but the number of further control devices 2 and/or sensors 3 may vary, for example according to the application case or vehicle technology, and be greater than or less than three, it also being possible for the number of further control devices 2 to be different from the number of sensors 3. The control device 1 may also be designed to cause a communication unit of the vehicle to provide a connection to a cloud server 6.

According to one example of the invention, a backend server 40 is suitable for a control center 4 and designed to be involved in the method according to an example of the invention for sending the emergency call 10. The backend server 40 of the control center 4 may be functionally connected to the cloud server 6 via a further cloud server 6.

By the method according to an example of the invention, the emergency call 10 is sent as follows.

The control device 1 of the vehicle automatically sends the emergency call 10, comprising the data packet 100, to the backend server 40 of the first control center 4, in particular a private control center (TPSP). The backend server 40 receives the emergency call 10 that is sent.

The backend server 40 forwards the received emergency call 10 directly and automatically to a second control center 5, in particular a public control center (PSAP), when a value of a parameter contained in the received data packet satisfies a predetermined condition.

The backend server 40 assigns the received emergency call 10 to the first control center 4, in particular a coordinator 41 of the first control center, when the value of the parameter contained in the received data packet 100 does not satisfy the predetermined condition. The coordinator 41 decides whether—even though with a time delay—the emergency call 10 is nevertheless forwarded to the second control center 5 or allocated to a caseworker 42 at the first control center 4 to work on the case.

The control device 1 ascertains a confidence value of the parameter and transmits the ascertained confidence value to a cloud server 6. The cloud server 6 stores the transmitted confidence value.

The cloud server 6 transmits the stored confidence value to the backend server 40 of the first control center 4. In particular, the confidence value may be ascertained and transmitted to the cloud server 6 at regular time intervals and/or on an event-controlled basis.

The backend server 40 may forward the received emergency call 10 immediately and automatically to the second control center 5 when the transmitted confidence value is greater than a predetermined minimum confidence value.

The embodiments and examples can be implemented in computing hardware (computing apparatus) and/or software, such as (in a non-limiting example) any computer that can store, retrieve, process, and/or output data and/or communicate with other computers. The processes can also be distributed via, for example, downloading over a network such as the Internet. The methods can utilize a processor in a computer system to output the results to a display device, printer, readily accessible memory or another computer on a network. A program/software implementing the embodiments may be recorded on computer-readable media comprising non-transitory computer-readable recording media. Examples of the computer-readable recording media include a magnetic recording apparatus, an optical disk, a magneto-optical disk, and/or a semiconductor member (for example, RAM, ROM, etc.). Examples of the magnetic recording apparatus include a hard disk device (HDD), a flexible disk (FD), and a magnetic tape (MT). Examples of the optical disk include a DVD (Digital Versatile Disk), a DVD-RAM, a CD-ROM (Compact Disc-Read Only Memory), and a CD-R (Recordable)/RW.

LIST OF DESIGNATIONS

1 Control device
10 Emergency call
100 Data packet
2 Further control device
3 Sensor
4 First control center
40 Backend server
41 Coordinator
42 Caseworker
5 Second control center
6 Cloud server.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

What is claimed is:

1. A method for sending an emergency call comprising:
   sending automatically, by a control device of a vehicle, an emergency call, comprising a data packet, to a backend server of a first control center;
   forwarding directly and automatically, by the backend server, the received emergency call to a second control center when a value of a parameter included in the received data packet satisfies a predetermined condition;
   by the control device, ascertaining a confidence value of the parameter and transmitting the ascertained confidence value to a cloud server;
   storing, by the cloud server, the transmitted confidence value;
   transmitting, by the cloud server, the stored confidence value to the backend server of the first control center; and
   forwarding immediately and automatically, by the backend server, the received emergency call to the second control center when the transmitted confidence value is greater than a predetermined minimum confidence value.

2. The method according to claim 1, further comprising:
   assigning, by the backend server, the received emergency call to the first control center when the value of the parameter included in the received data packet does not satisfy the predetermined condition.

3. The method according to claim 2, further comprising:
   ascertaining and transmitting to the cloud server the confidence value at regular time intervals and/or on an event-controlled basis.

4. The method according to claim 2, further comprising:
   ascertaining and transmitting to the cloud server the confidence value at regular time intervals and/or on an event-controlled basis.

5. The method according to claim 1, further comprising:
   defining, by a data structure for a data packet of the automatic emergency call, a minimum amount of data for the emergency call and at least one parameter.

6. The method according to claim 2, further comprising:
   defining, by a data structure for a data packet of the automatic emergency call, a minimum amount of data for the emergency call and at least one parameter.

7. The method according to claim 3, further comprising:
defining, by a data structure for a data packet of the automatic emergency call, a minimum amount of data for the emergency call and at least one parameter.

8. The method according to claim 5, wherein the data structure comprises a collision speed, a collision angle, a collision point and/or an activation behavior of a restraint system of a vehicle as the at least one parameter.

9. The method according to claim 6, wherein the data structure comprises a collision speed, a collision angle, a collision point and/or an activation behavior of a restraint system of a vehicle as the at least one parameter.

10. The method according to claim 7, wherein the data structure comprises a collision speed, a collision angle, a collision point and/or an activation behavior of a restraint system of a vehicle as the at least one parameter.

11. An apparatus comprising:
a control device for a vehicle, the control device to:
send automatically an emergency call, comprising a data packet, to a backend server of a first control center; and
ascertain a confidence value of a parameter included in the data packet and transmit the ascertained confidence value to a cloud server, wherein
the parameter to be included in the data packet received by the backend server, and the emergency call received by the backend server to be forwarded directly and automatically to a second control center when the value of the parameter included in the received data packet satisfies a predetermined condition;
the transmitted confidence value to be stored by the cloud server,
the stored confidence valued to be transmitted by the cloud server to the backend server of the first control center, and
the received emergency call to be forwarding immediately and automatically by the backend server to the second control center when the transmitted confidence value is greater than a predetermined minimum confidence value.

12. The apparatus according to claim 11, wherein
the received emergency call to be assigned by the backend server to the first control center when the value of the parameter included in the received data packet does not satisfy the predetermined condition.

13. The apparatus according to claim 12, wherein
the control device to ascertain and transmit the confidence value to the cloud server at regular time intervals and/or on an event-controlled basis.

14. An apparatus comprising:
a backend server for a control center to:
receive an emergency call, comprising a data packet, automatically sent by a control device of a vehicle;
forward directly and automatically the received emergency call to a second control center when a value of a parameter included in the received data packet satisfies a predetermined condition, wherein the control device to ascertain a confidence value of the parameter and transmit the ascertained confidence value to a cloud server, and the cloud server to store the transmitted confidence value and to transmit the stored confidence value to the backend server of the first control center; and
forward immediately and automatically the received emergency call to the second control center when the transmitted confidence value is greater than a predetermined minimum confidence value.

15. The apparatus according to claim 14, wherein the backend server to assign the received emergency call to the first control center when the value of the parameter included in the received data packet does not satisfy the predetermined condition.

16. The apparatus according to claim 15, wherein the confidence value to be ascertained and transmitted to the cloud server at regular time intervals and/or on an event-controlled basis.

* * * * *